United States Patent [19]
Adams

[11] Patent Number: 5,983,310
[45] Date of Patent: Nov. 9, 1999

[54] PIN MANAGEMENT OF ACCELERATOR FOR INTERPRETIVE ENVIRONMENTS

[75] Inventor: Phillip M. Adams, Salt Lake City, Utah

[73] Assignee: Novell, Inc., Provo, Utah

[21] Appl. No.: 08/799,192

[22] Filed: Feb. 13, 1997

[51] Int. Cl.$^6$ ............................................. G06F 09/32
[52] U.S. Cl. ........................... 711/6; 711/163; 711/167; 711/123; 709/102; 709/103; 709/301; 710/8
[58] Field of Search ................................ 711/6, 163, 167, 711/125, 123, 123–5; 395/681, 672, 826, 712, 672–3; 709/102–4, 301; 710/6–8

[56] References Cited

U.S. PATENT DOCUMENTS

| | | | |
|---|---|---|---|
| 5,249,286 | 9/1993 | Alpert et al. | 711/125 |
| 5,301,312 | 4/1994 | Christopher, Jr. et al. | 395/575 |
| 5,369,749 | 11/1994 | Baker et al. | 395/674 |
| 5,394,547 | 2/1995 | Correnti et al. | 395/650 |
| 5,414,848 | 5/1995 | Sandage et al. | 395/650 |
| 5,459,867 | 10/1995 | Adams et al. | 395/681 |
| 5,471,591 | 11/1995 | Edmonson et al. | 395/375 |
| 5,553,305 | 9/1996 | Gregor et al. | 395/826 |
| 5,555,398 | 9/1996 | Raman | 395/470 |
| 5,651,136 | 7/1997 | Denton et al. | 395/445 |
| 5,745,762 | 4/1998 | Celi, Jr. et al. | 395/681 |
| 5,778,226 | 7/1998 | Adams et al. | 395/681 |
| 5,781,792 | 7/1998 | Asghar et al. | 395/800.35 |

OTHER PUBLICATIONS

Andrew S. Tanenbaum, "Structured Computer Organization", Prentice–Hall, Inc., pp. 10–12, 1984.

*Primary Examiner*—John W. Cabeca
*Assistant Examiner*—Pierre-Michel Bataille
*Attorney, Agent, or Firm*—Madson & Metcalf

[57] ABSTRACT

An apparatus and method for accelerating interpreters, interpretive environments, may manage pinning of a processor cache closest to a processor. An instruction set implementing a virtual machine may store each instruction in a single cache line as a compiled, linked loaded image. After loading, the cache is pinned, disabled from flushing the contents or replacing the contents of any cache line. A fast load may flush the cache and run an application containing the entire virtual machine instruction set. A pin manager may be hooked into a scheduler in a multi-tasking operating system to load, pin, and unpin the processor cache as rapidly as needed. Thus, the processor cache may be available for general use, except when pinned for use by a virtual machine, such as an interpretive environment. Level-1 caches integrated into central processing units, particularly instruction caches or code caches are ideally suited to implementation of the invention.

6 Claims, 9 Drawing Sheets

PIN MANAGEMENT OF ACCELERATOR FOR INTERPRETIVE ENVIRONMENTS

BACKGROUND

1. The Field of the Invention

The invention relates generally to computers hosting interpreted languages and emulators, and more specifically to accelerators for emulators and interpreters such as Windows™, JAVA, Visual Basic, and other virtual machine environments executable by processors having access to caches.

2. The Background Art

Operations executed by a processor of a computer proceed in a synchronization dictated by a system clock. Accordingly one characteristic of a processor is a clock speed. For example, a clock speed may be 33 megahertz, indicating that 33 million cycles per second occur in the controlling clock.

A processor may execute one instruction per clock cycle, less than one instruction per clock cycle, or more than one instruction per clock cycle. Multiple execution units, such as are contained in a Pentium™ processor, may be operated simultaneously. Accordingly, this simultaneous operation of multiple execution units, arithmetic logic units (ALU), may provide more than a single instruction execution during a single clock cycle.

In general, processing proceeds according to a clock's speed. Operations occur only as the clock advances from cycle to cycle. That is, operations occur as the clock cycles. In any computer, any number of processors may exist. Each processor may have its own clock. Thus, an arithmetic logic unit (ALU) may have a clock operating at one speed, while a bus interface unit may operate at another speed. Likewise, a bus itself may have a bus controller that operates at its own clock speed.

Whenever any operation occurs, a request for interaction is made by an element of a computer. Then, a transfer of information, setup of input/output devices, and setup of the state of any interfacing devices, must all occur.

Each controller of any hardware must operate within the speed or at the speed dictated by its clock. Thus, clock speed of a central processing unit does not dictate the speed of any operation of a device not totally controlled by that processor.

These devices must all interface with one another. The slowest speed will limit the performance of all interfacing elements. Moreover, each device must be placed in the state required to comply with a request passed between elements. Any device that requires another device to wait while some higher priority activity occurs, may delay an entire process.

For example, a request for an instruction or data within a hard drive, or even a main, random-access memory, associated with a computer, must negotiate across a main system bus. A central processing unit has a clock operating at one speed. The bus has a controller with a clock that may operate at another speed. The memory device has a memory management unit that may operate at another speed.

Further to the example, a Pentium™ processor having a clock speed of 100 megahertz may be connected to peripheral devices or main memory by an industry standard architecture (ISA) bus. The ISA bus has a specified clock speed of 8 megahertz. Thus, any time the Pentium™ processor operating at 100 megahertz requests data from the memory device, the request passes to the opposite side of the ISA bus. The data may not be processed or delivered at a speed greater than that of the bus at 8 megahertz. Moreover, a bus typically gives low priority to the central processing unit. In order to avoid underruns and overruns, the input/output devices receive priority over the processor. Thus, the 100 megahertz processor may be "put on hold" by the bus while other peripheral devices have their requests filled.

Any time a processor must access any device beyond its own hardware pins, the hardware interface to the computer outside the processor proper, the required task cannot be accomplished within one clock count of the processor. As a practical matter, a task is not usually completed in less than several clock counts of the processor. Due to other priorities and the speeds of other devices, as well as the need to adjust or obtain the state configurations of interfacing devices, many clock counts of a processor may occur before a task is completed as required.

Associated with every hardware interface between hardware components, elements, and the like (anything outside an individual integrated chip), a hardware handshake must occur for any communication. A handshake, including a request and an acknowledgement, must occur in addition to a transfer of actual data or signals. Handshake protocols may actually involve several, even many, clock counts for the request alone, the acknowledgement alone, and for passing the data itself. Moreover, a transmission may be interrupted by a transaction having a higher priority. Thus, communicating over hardware interfaces is relatively time consuming for any processor. Hardware interfacing may greatly reduce or eliminate the benefits of a high-speed processor.

To alleviate the need to communicate across hardware interfaces during routine processing, modern computer architectures have included processor caches. In general, processors benefit from maintaining as close to themselves as possible all instructions, data, and clock control. This proximity reduces the need for interfaces, the number of interfaces, the interface complexity, and thus, the time required for compliance with any instruction or necessary execution. Thus, caches have been moved closer and closer to the processor.

Memory caches are common. Such a cache is created within a dedicated portion of a memory device. These are different, however, from caches dedicated to a processor.

The INTEL 386™ processor contains an optional external cache connected to the processor through a cache controller chip. The INTEL 486™ contains an internal 8 kilobyte cache on the central processing unit itself. Within the chip containing the processor, is integrated a cache. This cache is dedicated to both code and data accesses.

The 486™ also supports another cache (a level-2 cache, as opposed to the primary or level-1 cache just described above). Access to the level-2 cache is through an external cache controller chip, similar to that of the 386™. In each case, for both the 386™ and 486™ processors, the external cache controller is itself positioned on a side of the processor's internal bus (CPU bus) opposite that of the processor.

The Pentium™ processors contain a level-1 (primary) data cache as well as a level-1 code cache. Thus, code and data are segregated, cached separately. The Pentium™ processors continue to support an external, level-2 cache across a CPU bus.

One should understand that the expression "bus", hereinabove, refers to the processor bus, rather than the system bus. For example, the main system bus connects a processor to the main memory. However, the cache controllers and caches on a processor, or external to the processor but simply located across a processor's internal bus interface unit, do not rely on the main system bus.

A cache has some fixed amount of memory. A code cache will contain certain executable instructions, a data cache will contain data, and a non-segregated cache may contain both. The memory of any type of cache is typically subdivided into cache lines. For example, a typical cache line may contain 32 bytes of information. Thus, a cache line contains a standard number of bytes in which space may be stored a copy of certain information obtained from a main memory device.

Associated with each cache line is a tag. The tag binds a physical address and a logical address corresponding to the contents of an associated cache line.

The physical and logical addresses contained in the tag associated with a cache line may correspond to a physical location in the main memory device, and a logical position within an application respectively.

Caches associated with a processor are transparent, even hidden, with respect to a user and an application. Each cache has an associated controller. In operation, a cache controller effectively "short circuits" a request from a processor to a memory unit. That is, if a particular address is referenced, and that address exists in a tag associated with the contents of a cache line in a cache, the cache controller will fulfill the request for the instruction out of the cache line containing it. The request is thus fulfilled transparently to the processor. However, the effect of a cache is to eliminate, as much as possible, communication through hardware interfaces as described above. Thus, a cache may greatly improve the processing speed of applications running on processors.

Tags may also have associated therewith two numbers referred to as "use bits." The use bits may typically represent a simple count of use. This count may be useful to the cache controller in determining which cache lines are the least recently used (LRU). Accordingly, a cache controller may refer to the LRU count to determine which cache lines have been referenced the least number of times.

Incidently, but significantly, with respect to the invention, some cache controllers may churn a cache. That is, if an insignificant number of bits is contained in the LRU or use bits, then a counter may be improperly reset to zero due to count "wrap-around" during high use. Thus, highly-used cache lines may actually be swapped out, churning the cache and dramatically decreasing efficiency.

Several difficulties exist with caches. A cache controller has a general purpose function to service address requests generally. For example, a virtual machine may be implemented in some limited number of instructions. In operating such a virtual machine, a computer processor has an underlying native language in which the virtual machine instructions are written. The virtual machine instructions will be requested repeatedly. The virtual machine instructions are accessed relatively slowly if they are treated simply as another general purpose instruction being retrieved periodically into the cache.

Many processors pipeline instructions. Two problems may occur with pipelining. The first is flushing a pipeline as a result of a branch. The other is stalling due to requested data not arriving within a next clock count in sequence. That is, whenever a cache "miss" occurs, a request has been made to the cache, but the cache cannot respond because the information is not resident. Misses may occur repeatedly over extensive numbers of clock counts while a cache controller accesses a main memory device to load the requested instructions or data. Misses decimate the efficiency of processors. Meanwhile, even with branch prediction methods, a pipeline may flush several instructions with a resulting loss of processing performance.

BRIEF SUMMARY AND OBJECTS OF THE INVENTION

In view of the foregoing, it is a primary object of the present invention to provide pin management of an accelerator for increasing the execution speed of interpretive environments.

It is another object of the invention to provide programmatic control of persistence of executables stored in a code cache.

It is another object of the invention to provide a set of virtual machine instructions forming a virtual machine, in which each of the compiled or assembled, linked, and loaded native code segments implementing a virtual machine instruction is sized to fit within a standard number of cache lines in a cache.

It is another object of the invention to provide a heuristic determination for pinning the contents of a cache programmatically by a processor.

It is another object of the invention to provide a main memory device containing data structures adaptable to be cached, pinned, and thereafter executed by a processor, without requiring repeated access to the main memory device for retrieval of any instruction.

It is another object of the invention to provide a virtual machine containing an instruction set sized to fit completely within a cache, to be addressable directly by cache line, a unique cache line number corresponding to each machine-native code segment implementing a single virtual machine instruction.

It is another object of the invention to provide a device having programmatic control over the content and persistence of the contents of a cache, particularly a code cache, and more particularly a level-1 code cache, especially a level-1 code cache integrated into a central processing unit.

It is another object of the invention to provide a method to accelerate execution of an interpretive environment by copying instructions of an instruction set into the code cache and pinning those instructions for the duration of the use by the processor of any instructions in the set, in order to increase the speed of processing the virtual machine instructions, eliminate cache misses, optimize pipelining within the processor, while minimizing supporting calculations such as those for addressing and the like.

It is another object of the invention to provide heuristic determination of when to pin a cache, particularly code cache, based on a cost function of some performance parameter, such as frequency of use, infrequency of use, size, and inconvenience of reloading a particular instruction to be cached.

Consistent with the foregoing objects, and in accordance with the invention as embodied and broadly described herein, an apparatus and method are disclosed in one embodiment of the present invention as including a central processing unit (CPU) having an operably associated processor cache, preferably a level-1 cache. The level-1 cache is closest to the actual processor in the CPU.

The cache may actually be integrated into the CPU. The processor may be programmed to install a full set of virtual machine instructions (VMI) in the cache. The VMI set may then be pinned to eliminate cache "misses" by the processor.

Much interest has been focused over decades on virtual machines. Nevertheless, the slow performance (compared to native code processing) of virtual machines has largely counter-balanced the platform-independent benefits associated therewith.

However, specific knowledge may exist with respect to a particular environment. To take better advantage of interpreted environments generally, such as virtual machines, and cache technology, an apparatus and method in accordance with the invention may rely on this knowledge of the execution environment for a virtual machine in order to optimize the use of both the virtual machine instructions and the cache. Knowing in advance that certain instructions will definitely be required, much faster execution speeds may be obtained by maintaining those instructions in a low level cache as close to the processor as possible.

For example, in one embodiment, an apparatus and method in accordance with the invention may "programmatically control" the contents of the cache. The cache may be loaded with a full set of virtual machine instructions, properly compiled or assembled, linked, and loaded.

The set may incorporate in a length not to exceed a standardized specified number of cache lines, the executable, machine-language implementation of each command or instruction provided in an interpretative environment. The set, fit to the total available cache lines, may define a virtual machine (the entire interpreter). The set may be pinned, after being loaded into a previously evacuated cache.

Loading may be accomplished by running a simple application having no particular meaning, but containing all of the VMIs at least once. Knowing that the cache will respond as designed, one may thus load all of the native code segments implementing the VMIs automatically into the cache in the fastest mode possible, controlled by the cache controller. Yet, the entire process is prompted by programmatic instructions, knowingly applied.

This "programmatic control," in lieu of general purpose control, of a cache, especially a code cache, may completely eliminate cache "misses." This greatly enhances the effective operating speed of an interpreted or interpretive environment.

A pin manager may be interposed or hooked into an operating system to pin and unpin the processor cache associated with a processor hosting a multi-tasking operating system. A pin manager may perform several functions in sequence. It tests for the presence of an interpretive process as the next in line to be executed by a processor. If such is present, the pin manager disables interrupts, flushes the processor cache (preferably with writeback if a nonsegregated cache, in order to save data changes), loads the processor cache (preferably by execution of a mock application containing all the instructions of the interpretive environment), disables the processor cache to effectively pin the processor cache to continue operating without being able to change its contents, and then re-enables the interrupts to continue normal operation of the processor.

The invention may disable interrupts in order to eliminate all possibility of a change in control flow during "loading" of the cache with the desired contents. Otherwise, an interrupt from a hardware device may pre-empt current execution, loading an interrupt service routine into the processor cache.

The pin manager may then flush the processor cache. A flush of a processor cache invalidates all of the contents of the cache lines in the cache. Writeback saves the contents of altered (dirty) cache lines back to main memory.

The pin manager then loads the processor cache, preferably by running a mock application. The mock application may introduce every desired code segment, each implementing an individual interpreter instruction (virtual machine instruction), into the cache.

The pin manager next disables the processor cache. A disable of a cache actually disables only its ability to change the contents of any cache line. Thus the disable does not inhibit cache operation, nor operation of the cache controller, but merely the ability of the cache to be updated by changing the contents of any cache line.

Finally, the pin manager may re-enable the interrupts. Re-enablement returns the processor to normal operation.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 9, is not intended to limit the scope of the invention, as claimed, but it is merely representative of the presently preferred embodiments of the invention.

The presently preferred embodiments of the invention will be best understood by reference to the drawings, wherein like parts are designated by like numerals throughout.

Those of ordinary skill in the art will, of course, appreciate that various modifications to the details illustrated in the schematic diagrams of FIGS. 1–9 may easily be made without departing from the essential characteristics of the invention. Thus, the following description is intended only as an example, and simply illustrates one presently preferred embodiment consistent with the invention as claimed herein.

Figure 1:
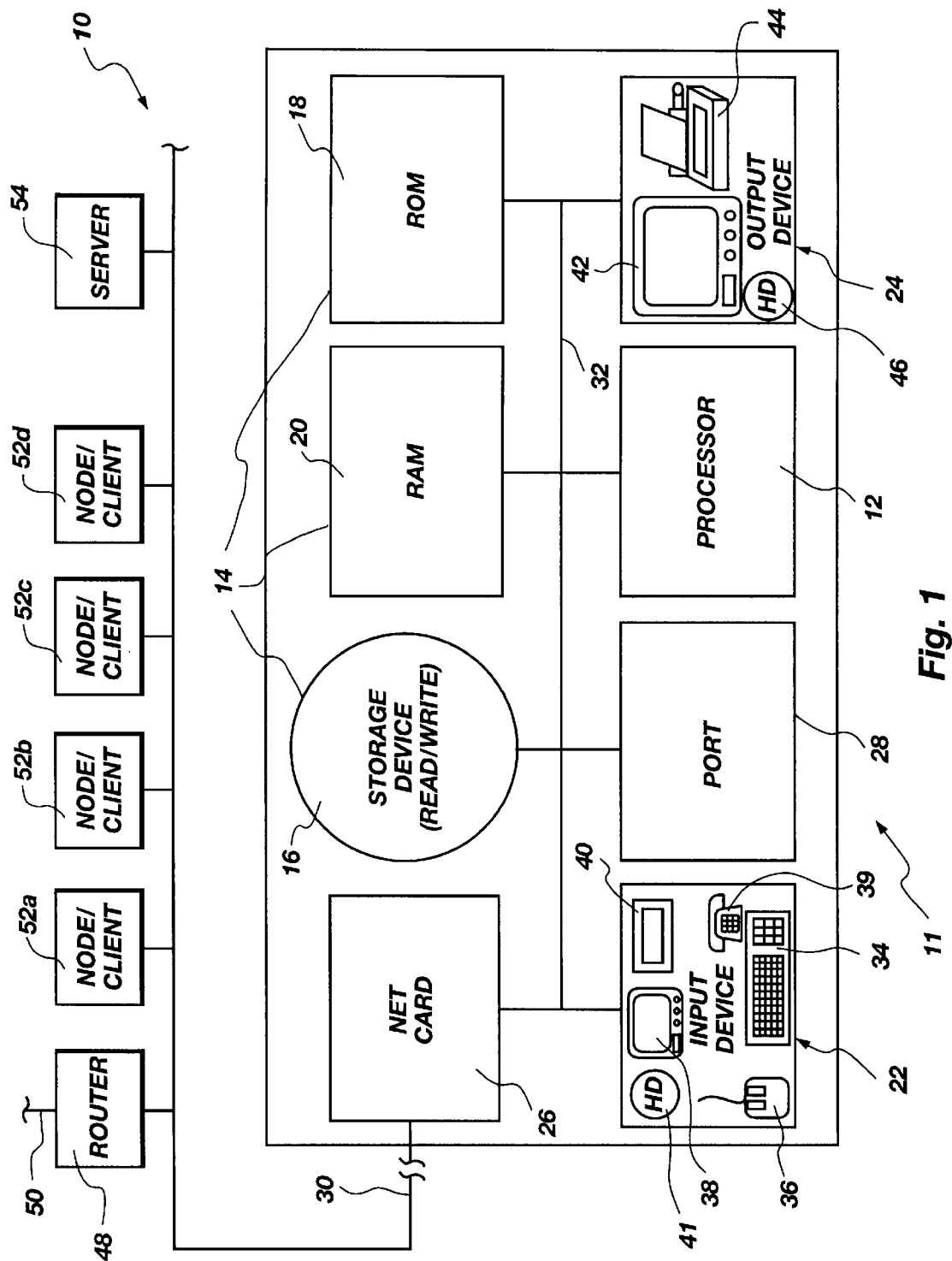
FIG. 1 is a schematic block diagram of an apparatus in accordance with the invention.
Figure 2:
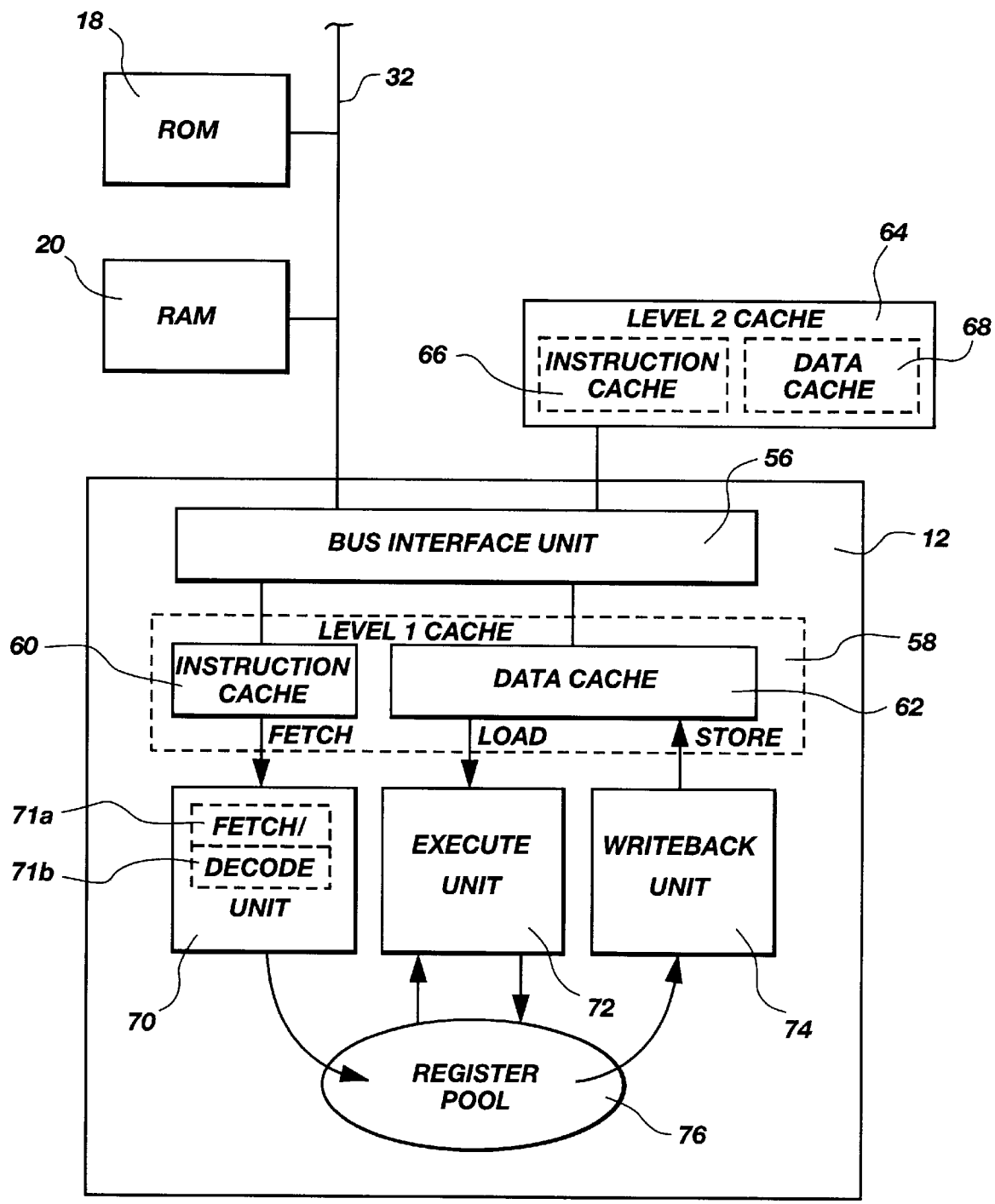
FIG. 2 is a schematic block diagram showing implementation details for one embodiment of the apparatus of FIG. 1.
Figure 3:
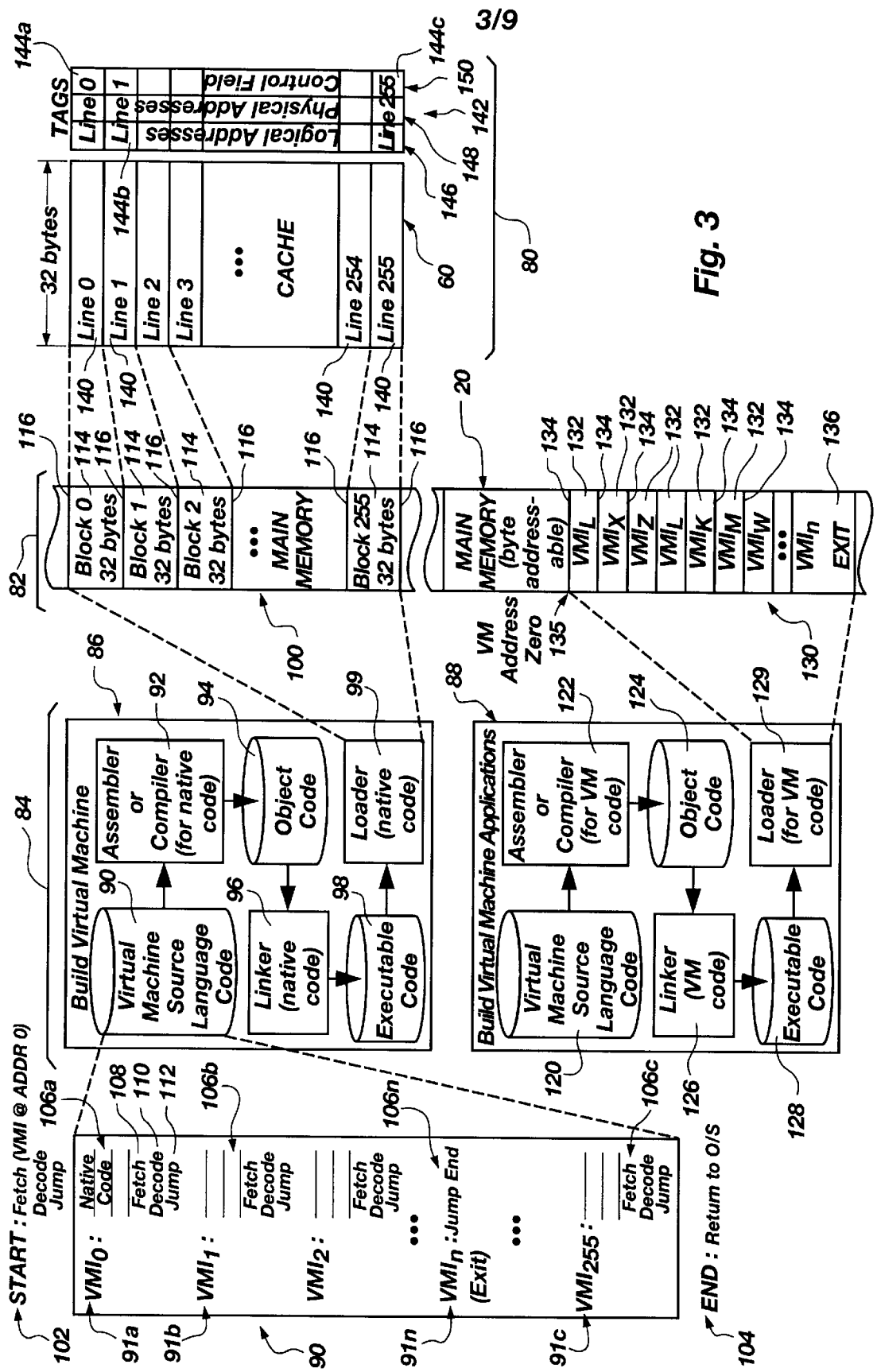
FIG. 3 is a schematic block diagram of executable modules and data structures consistent with one implementation of an apparatus and method in accordance with the invention.

Referring now to FIGS. 1–3, and more particularly, an apparatus 10 may include a node 11 (client 11, computer 11) containing a processor 12 or CPU 12. The CPU 12 may be operably connected to a memory device 14. A memory device 14 may include one or more devices such as a hard drive or non-volatile storage device 16, a read-only memory 18 (ROM) and a random access (and usually volatile) memory 20 (RAM).

The apparatus 10 may include an input device 22 for receiving inputs from a user or another device. Similarly, an output device 24 may be provided within the node 11, or accessible within the apparatus 10. A network card 26 (interface card) or port 28 may be provided for connecting to outside devices, such as the network 30.

Internally, a bus 32 (system bus 32) may operably interconnect the processor 12, memory devices 14, input devices 22, output devices 24, network card 26 and port 28. The bus 32 may be thought of as a data carrier. As such, the bus 32 may be embodied in numerous configurations. Wire, fiber optic line, wireless electromagnetic communications by visible light, infrared, and radio frequencies may likewise be implemented as appropriate for the bus 32 and the network 30.

Input devices 22 may include one or more physical embodiments. For example, a keyboard 34 may be used for interaction with the user, as may a mouse 36. A touch screen 38, a telephone 39, or simply a telephone line 39, may be used for communication with other devices, with a user, or the like. Similarly, a scanner 40 may be used to receive graphical inputs which may or may not be translated to other character formats. A hard drive 41 or other memory device 14 may be used as an input device whether resident within the node 11 or some other node 52 (e.g., 52a, 52b, etc.) on the network 30, or from another network 50.

Output devices 24 may likewise include one or more physical hardware units. For example, in general, the port 28 may be used to accept inputs and send outputs from the node 11. Nevertheless, a monitor 42 may provide outputs to a user for feedback during a process, or for assisting two-way communication between the processor 12 and a user. A printer 44 or a hard drive 46 may be used for outputting information as output devices 24.

In general, a network 30 to which a node 11 connects may, in turn, be connected through a router 48 to another network 50. In general, two nodes 11, 52 may be on a network 30, adjoining networks 30, 50, or may be separated by multiple routers 48 and multiple networks 50 as individual nodes 11, 52 on an internetwork. The individual nodes 52 (e.g. 52a, 52b, 52c, 52d) may have various communication capabilities.

In certain embodiments, a minimum of logical capability may be available in any node 52. Note that any of the individual nodes 52a–52d may be referred to, as may all together, as a node 52.

A network 30 may include one or more servers 54. Servers may be used to manage, store, communicate, transfer, access, update, and the like, any number of files for a network 30. Typically, a server 54 may be accessed by all nodes 11, 52 on a network 30. Nevertheless, other special functions, including communications, applications, and the like may be implemented by an individual server 54 or multiple servers 54.

In general, a node 11 may need to communicate over a network 30 with a server 54, a router 48, or nodes 52. Similarly, a node 11 may need to communicate over another network (50) in an internetwork connection with some remote node 52. Likewise, individual components 12–46 may need to communicate data with one another. A communication link may exist, in general, between any pair of devices.

Referring now to FIG. 2, a processor 12 may include several internal elements. Connected to the bus 32, a bus interface unit 56 handles the bus protocols enabling the processor 12 to communicate to other devices over the bus 32. For example, the instructions or data received from a ROM 18 or data read from or written to the RAM 20 may pass through the bus interface unit 56.

In some processors, a processor cache (e.g. cache 58,64), such as a level-1 cache 58 may be integrated into the processor 12. In specific embodiments of processors 12, such as the Pentium™ and Pentium™ Pro processors, as well as the PowerPC™ by Motorola, the level-1 cache 58 may be optionally subdivided into an instruction cache 60 and a data cache 62.

A level-1 cache 58 is not required in a processor 12. Moreover, segregation of the instruction cache 60 from the data cache 62 is not required. However, a level-1 cache 58 provides rapid access to instructions and data without resort to the main memory 18, 20 (RAM 20). Thus, the processor 12 need not access (cross) the bus interface unit 56 to obtain cached instructions and data.

Certain processors 12 maintain an external cache 64. The external cache 64 is identified as a level-2 cache in FIG. 2. Nevertheless, the level-2 cache 64 may be a level-1 cache if no level-1 cache 58 is present on the processor 12 directly. Similarly, the external cache 64 may or may not be segregated between an instruction cache 66 and a data cache 68. Any suitable processor cache may be used.

Execution, normally associated with a processor 12, is actually most closely related to a fetch/decode unit 70, an execute unit 72, and a writeback unit 74. Likewise, associated with each cache 58, 64, is typically an inherent, integrated, hardware controller. The cache controller may be thought of as control logic built into the cache hardware.

When the fetch unit 71a issues a request for an instruction, the request goes to the bus interface unit 56. The level-1 cache 58 makes a determination whether or not the request can be satisfied by data or instructions identified with the logical address requested from cached data and instructions.

If an instruction cannot be provided by the level-1 cache 58, the level-2 cache 64 may respond to the request. If the desired item (data or instruction) is not present in either the level-1 cache 58 or the level-2 cache 64, then the main memory 18, 20 may respond with the desired item. Once the request has been fulfilled by the fastest unit 58, 64, 20, 18 to respond with the desired item, the request is completed, and no other devices will respond.

Main memory may include the ROM 18, the RAM 20, or both. Nevertheless, many computers boot up using the contents of the ROM 18 and thereafter use the RAM 20 for temporary storage of data associated with applications and the operating system. Whenever "main memory" is mentioned, it is contemplated that it may include any combination of the ROM 18 and RAM 20.

Once an instruction is retrieved for the fetch unit 71a, the instruction is passed to the decode unit 71b. The fetch 71a and decode 71b are typically highly integrated, and perform in an overlapped fashion. Accordingly, a fetch/decode unit 70 is typical.

As a practical matter, the decode unit 71b may identify a current instruction to be executed. Identification may involve identification of what type of instruction, what type of addressing, what registers will be involved, and the like. The presence of the instruction in an instruction register, may itself stimulate execution on the next clock count.

Once identification of an instruction is completed by the decode unit 71b, an execute unit 72 may immediately process the instruction through low-level, control-loop hardware. For example, sequencers, registers, and arithmetic logic units may be included in an execute unit 72.

Each instruction as it is fetched, decoded, executed, and the like, may require interaction between an individual processing unit 70, 72, 74 and a register pool 76. The registers 76 (register pool 76) are hidden from programmers and applications. Nevertheless, the hardware architecture of the processor 12 provides a hardware logic governing interaction between the units 70, 72, 74 and between the registers 76 and the units, 70, 72, 74.

Upon completion of execution of an instruction, a writeback unit 74 may provide an output. Accordingly, the output may be passed to the bus interface unit 56 to be stored as appropriate. As a practical matter, a result may be stored in a cache 58 of a level-1 variety or in a level-2 cache 64. In either event, a writeback unit 74 will typically write through to the main memory 18, 20 an image of the result.

Modern processors 12, particularly the Pentium™ processors, use a technique called pipelining. Pipelining passes an instruction through each of the fetch/decode/execute steps undergone by that instruction as quickly as possible. An individual instruction is not passed completely through all of its processing steps before the next instruction in order is begun.

For example, a first instruction may be fetched, and on the next clock count another instruction may be fetched while the first instruction is being decoded. Thus, a certain parallel, although slightly offset in time, processing occurs for instructions.

An advantage of a method and apparatus in accordance with the invention is that instructions may be more effectively pipelined. That is, prediction routines have been built into hardware in the Pentium™ class of processors 12. However, prediction is problematic. Inasmuch as a branch may occur, within approximately every five machine code instructions on average, the pipeline of instructions will be in error periodically. Depending on the sophistication of a prediction methodology, one or more instructions in a pipeline may be flushed after entering a pipeline at the fetch unit 71a.

Referring now to FIG. 3, a virtual machine 90 or an instruction set 90 implementing a virtual machine 90 on a processor 12 is illustrated schematically. Relationships are illustrated for caching 80 or a cache system 80 for storing loaded and executable instructions 106 (e.g. 106a) corresponding to virtual machine instructions 91 (e.g. 91a) of a virtual machine 90 or virtual machine instruction set 90.

A virtual machine 90 may be built upon any available programming environment. Such virtual machines 90 may sometimes be referred to as interpreters, or interpreted systems. Alternatively, virtual machines 90 are sometimes referred to as emulators, wherein a set of instructions 91–n may be hosted on a processor 12 of one type to mimic or emulate the functional characteristics of a processor 12 in a hardware device of any other type.

An application may be written to run on or in an environment created for a first hardware device. After the application is fully developed and operational, the application may then be "ported" to another machine. Porting may simply include writing a virtual machine 90 for the second hardware platform. Alternatively, an application may be developed in the native language of a first machine, and a single set 90 of virtual machine instructions 91a–n may be created to emulate the first machine on a second machine. A virtual machine 90 is sometimes referred to as an emulation layer. Thus, an emulation layer or virtual machine 90 may provide an environment so that an application may be platform-independent. A JAVA interpreter, for example, performs such a function.

An executable 82 loaded into main memory 18, 20 contains the original images of the contents of the cache system 80. A building system 84 that may be thought of as an apparatus, modules running on an apparatus, or a system of steps to be performed by an apparatus, is responsible to build contents to be loaded into the executable 82.

A builder 86 may be tasked with building and loading an executable image 100 of a virtual machine 90. Similarly, a builder 88 may build an executable image 130 of the instructions 106 implementing an application written in the virtual machine instructions 91 constituting the virtual machine 90. In general, the executable 130 or executable image 130 may represent any application ready to be executed by the execute unit 72 of the processor 12. One embodiment of an executable 130 or an image 130 may be an application written specifically to prompt a high speed loading as described with respect to FIG. 4 below.

A virtual machine 90 or a set 90 of virtual machine instructions 91a–n may contain an individual instruction (e.g. 91a, 91b, 91n) corresponding to each specific, unique function that must be accommodated by the virtual machine 90. The virtual machine instruction 91n, for example, provides the ability to terminate execution.

In FIG. 3, the builder 86 may include source code 90, virtual machine source code 90. The source code 90 may be assembled or compiled by an assembler 92 or compiler 92, as appropriate. The virtual machine may operate adequately, whether dependent on assembly or compilation. The assembler 92 or compiler 92 operates for native code. Native code, may be thought of as code executable directly on a processor 12 in the apparatus 10.

By native code is indicated the processor-specific instructions 91 that may be executed directly by a processor 12. By directly is not necessarily meant that the native code is always written in binary ones and zeros. Native code 106 may be written in a language to be assembled 92 or compiled 92 into object code 94 and to be eventually linked 96 into an executable 100 loaded for execution. Executables 100 may then be loaded 99 into a memory device 20, 18 for ready execution on or by an execute unit 72 of a processor 12. An executable 100 stored in a non-volatile storage device 16 may sometimes be referred to as an executable file. Once properly loaded 99 into the main memory 18, 20 associated with a processor 12 an executable 100 may be executed by a processor 12.

The assembler 92 or compiler 92 provides object code 94 in native code instructions. The object code 94 may be linked to library routines or the like by a linker 96. The linker 96 may provide all other supporting instructions necessary to run the object code 94. Thus, the linker 96 provides, as output, executable code 98. As a practical matter, the executable code 98 will be run directly from main memory 18, 20 as a loaded executable 100. Thus, a loader 99 may load the executable code 98 into main memory 18, 20 as the loaded code 100.

Code segments 106a–n are written in native code. When any code segment 106a–n (e.g. 106a, 106b, 106c, 106n) is executed, the result is the desired output from the corresponding virtual machine instruction 91a–n (e.g. 91a, 91b, 91c, 91n, respectively). Virtual machine instructions 91a–n identify every available function that may be performed by the virtual machine 90. The instructions 106a–n illustrate segments 106a–n, implementations in native code, executably the hardware, processor 12, that must produce the result associated with each individual virtual machine instruction 91a–n.

Each of the code segments 106a–n contains a FETCH instruction 108 DECODE instruction 110 and JUMP instruction 112. The instructions 108–112 promote pipelining. Thus, the subject of each of the respective instructions decode 110, fetch 108, and JUMP 112 correspond to the very next instruction, the second next instruction, and the third next instruction, respectively, following an instruction 91a–n being executed and corresponding to a code segment 106a–n in question.

A virtual machine instruction set 90 should include a HALT instruction 91n. Thus, a virtual machine instruction 91n within the virtual machine 90 will contain a segment 106n of native code indicating to the processor 12 the fetching and decoding process for instructions used in all applications. The last virtual machine instruction 91a–n contained within a loaded application 130 is a HALT instruction 91n (106n).

In FIG. 3, the loaded executable 100 may be stored in a block 114 separated by block boundaries 116. In the Pentium™ class of processors, each block 114 contains 32 bytes of data. The instruction set 90 or virtual machine 90 contains no more than 256 virtual machine instructions 91a–n. Accordingly, the code segments 106a–n, when compiled, linked, and loaded, may each be loaded by the loader 99 to begin at a block boundary 116, in one currently preferred embodiment. Thus, the number of blocks 114 and the size of each block 114 may be configured to correspond to a cache line 140 in the cache 60. Thus, an image of a code segment 106a–n, compiled, linked, and loaded for each virtual machine instruction 91a–n, exists in a single cache line 140. Likewise, every such virtual machine instruction 91a–n and its native code segment 106a–n has an addressable, tagged, cache line 140 available in the 256 cache lines.

In addition to the builder 86, a builder 88 may build any virtual machine application 120. In FIG. 3, the process of building an application 120 is illustrated. For example, a mock application may be constructed for the exclusive purposes of high-speed loading of the code segments 106 into the cache lines 140. In the embodiment shown, virtual machine source language code 120 or source code 120 may be written to contain instructions 91 arranged in any particular order. In general, instructions 91 are used by a programmer in any suitable order to provide and execute an application 120.

In an embodiment of an apparatus and method in accordance with the invention, the source code 120 may simply contain each of the virtual machine instructions 91 in the virtual machine language. The source code 120 may be assembled or compiled by an assembler 122 or compiler 122 depending on whether the language is an assembled or a compiled language.

The assembler 122 or compiler 122 generates (emits, outputs) virtual machine code. The output of the assembler 122 or compiler 122 is object code 124. The object code 124 may be linked by a linker 126 to produce an executable code 128. The executable code 128 may be loaded by a loader 129 into main memory 18, 20 as the loaded executable 130.

The loaded executable 130 is still in virtual machine code. Thus, an application developed in the virtual machine language must be run on a virtual machine. The virtual machine 90 is stored in the cache 60. The cache 60 may actually be thought of as any processor cache, but the closest cache to a processor 12, is capable of the fastest performance.

The loaded executable 130 is comprised of assembled or compiled, linked, and loaded, virtual machine instructions 132. A main memory device 20 is byte addressable. Each of the virtual machine instructions 132 begins at an address 134. Thus, each virtual machine instruction 132 may be of any suitable length required. Nevertheless, a virtual machine address zero 135 may be identified by a pointer as the zero position in the virtual machine 130. Each subsequent address 134 may thus be identified as an offset from the virtual machine zero 135. A last instruction 136 should be effective to provide an exit from the loaded executable 130. Typically, loaded executables 130 are executed in the order they are stored in the memory device 20.

The cache 60 has associated therewith a tag table 142. For each cache line 140, an appropriate tag line 144 exists (e.g. 144a, 144b, 144c). Associated with each tag line 144, is a logical address 146 corresponding to the address 134 of the cache line 140 in question. Likewise, a physical address 148 in a tag line 144 corresponds to an address 116 or block boundary 116 at which the code 114 is stored in the main memory 18, 20. A control field 144c may contain symbols or parameters identifying access rights, and the like for each cache line 140.

Thus, in general, a loaded executable 130 (application 130) has a logical address 134 associated with each virtual machine instruction 132. The logical address 134 associated with the beginning of an instruction 132 is bound by the tag table 142 to the physical address 116 associated with the executable code 100 associated with the corresponding code segment 106 whose compiled, linked, and loaded image is stored at the respective cache line 140 associated with the tag line 144 binding the logical address 134, 146 to the physical address 116, 148.

Figure 4:
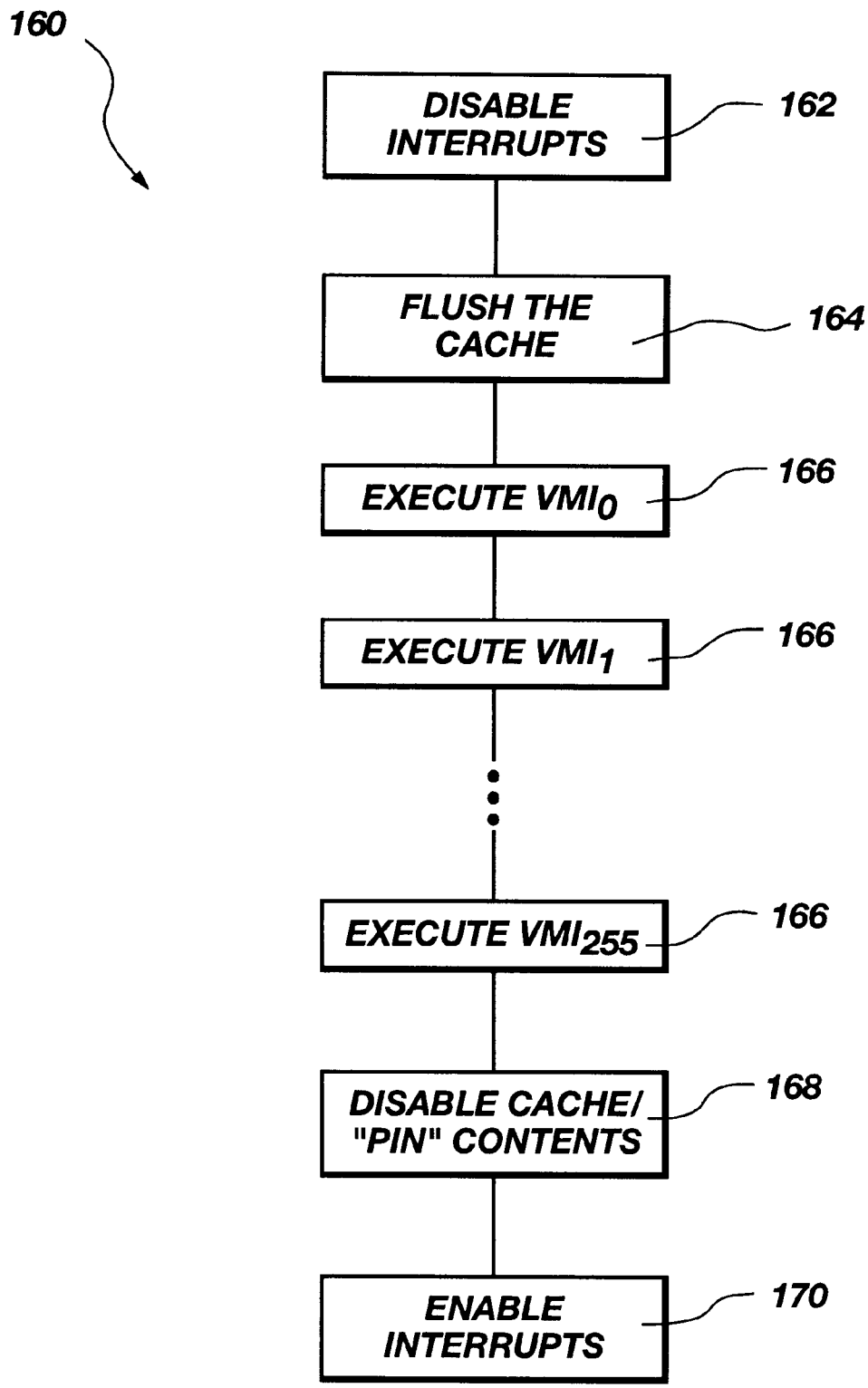
FIG. 4 is a schematic block diagram of a method in accordance with the invention.

Referring to FIG. 4, a method 160 is described and illustrated schematically. The method 160 locks or pins a cache after loading the native code implementation of individual virtual machine instructions into the cache.

A disable 162 may be executed by the processor to disable interrupts from being serviced. The disable 162 provides temporary isolation for the cache 60, enabling completion of the process 160 or method 160. The cache 60 is next flushed 164 typically with write-back, which causes "dirty" cache data to be written back to main memory 18, 20. Thus, in the control field 150 may be a byte indicating that each cache line 140 is available. Thus, the processor 12 need not thereafter execute the multiple steps to remove the contents of any cache line 140 in preparation for loading new contents.

The execute steps 166 correspond to execution by the processor 12 of individual instructions 132 in a loaded application 130. Upon fetching for execution 166 each instruction 132, the processor 12 places a request for the instruction 132 next in order in the loaded application 130.

The cache controller for the cache 60 first reviews the contents of the tag table 142 to determine whether or not the desired instruction is present in the cache 60. Having been flushed, the cache 60 has no instructions initially. Accordingly, with each execute 166, a new instruction 132 is loaded from the main memory 18, 20 into the cache 60 at some appropriate cache line 140. Immediately after loading into the cache 60, each instruction 132 in order is executed by the processor 12. However, at this point, any output is ignored. The execution 166 is simply a by-product of "fooling" the cache into loading all the instructions 132 as rapidly as possible, as pre-programmed into the hardware.

In one embodiment of an apparatus and method in accordance with the invention, a loaded application 130 contains every instruction 132 required to form a complete set of instructions for a virtual machine. The instructions 132 are actually code segments 106 implementing a virtual machine instruction 91 in the native code of the processor 12. No output is needed from the initial application 130 run during the method 160.

In one currently preferred embodiment of an apparatus and method in accordance with the invention, the virtual machine instruction set 100 is written so that each block 114 contains a single instruction 91. Moreover, the instruction set 90 is written to occupy exactly the number of cache lines 140 available in the cache 60.

In certain embodiments, an individual instruction 91 may occupy more than a single cache line 140. For example, some caches may have a 16 byte line length. Thus, a 32 byte length for an instruction 91 may require two cache lines 140. In one presently preferred embodiment, a number of cache lines 140 may correspond exactly to the number of blocks 114 required to hold all of the instructions 91, such that each instruction 91 may be addressed by referring to a unique cache line 140.

Thus, upon completion of execution of an initial application 130 configured for loading the cache 60, no output may be provided. However, the cache 60 with its controller operating normally, loads every instruction 91 referenced by the application 130. Therefore, each cache line 140 contains a code segment 106 or native code segment 106 implementing a virtual machine instruction 91. Each cache line 140 contains the code segment 106 corresponding to a virtual machine instruction 91 in a cache 60 having a line length of 32 bytes.

After the executions 166 of the virtual machine instructions 132 of the application 130 designed for the loading of virtual machine instruction code 106 into the cache 60, a disable 168 may disable the cache 60. The effect of the disable 168 is to pin the contents of each cache line 140. Pinning (locking) indicates that the cache controller is disabled from replacing the contents of any cache line 140.

Nevertheless, the cache 60 continues to operate normally, otherwise. Thus, the controller of the cache 60 will continue to refer to the tag table 142 to determine whether or not an address 146, 148 requested is present. In the case of a virtual machine 90, every instruction 91 will be present in the cache 60, if the instructions are designed in accordance with the invention. Thus, the tag table 142 will always contain the code 106 associated with any address 146, 148 representing any virtual machine instruction 91.

Less than a full set of instructions 91 may be loaded into a cache 60. Alternatively, for a cache 60 having more cache lines 140 than needed for storing a virtual machine 90 in its entirety, unused cache lines 140 may be devoted to other code, loaded in a similar way, prior to pinning. Code may be selected according to recency of use, cost/benefit analysis of use, or cost/benefit analysis of retrieval from main memory 18, 20.

The cache 60 is used by way of example. The virtual machine 90 will operate fastest by using the cache 60 closest to the fetch/decode unit 70. Alternatively, another cache 64 may be used. Thus, everything describing the cache 60 may be applied to the cache 66 or the cache 64 so far as loading and pinning of the cache 60 are concerned. The enable 170 may re-enable the interrupts so that the processor 12 may resume normal operations.

Figure 5:
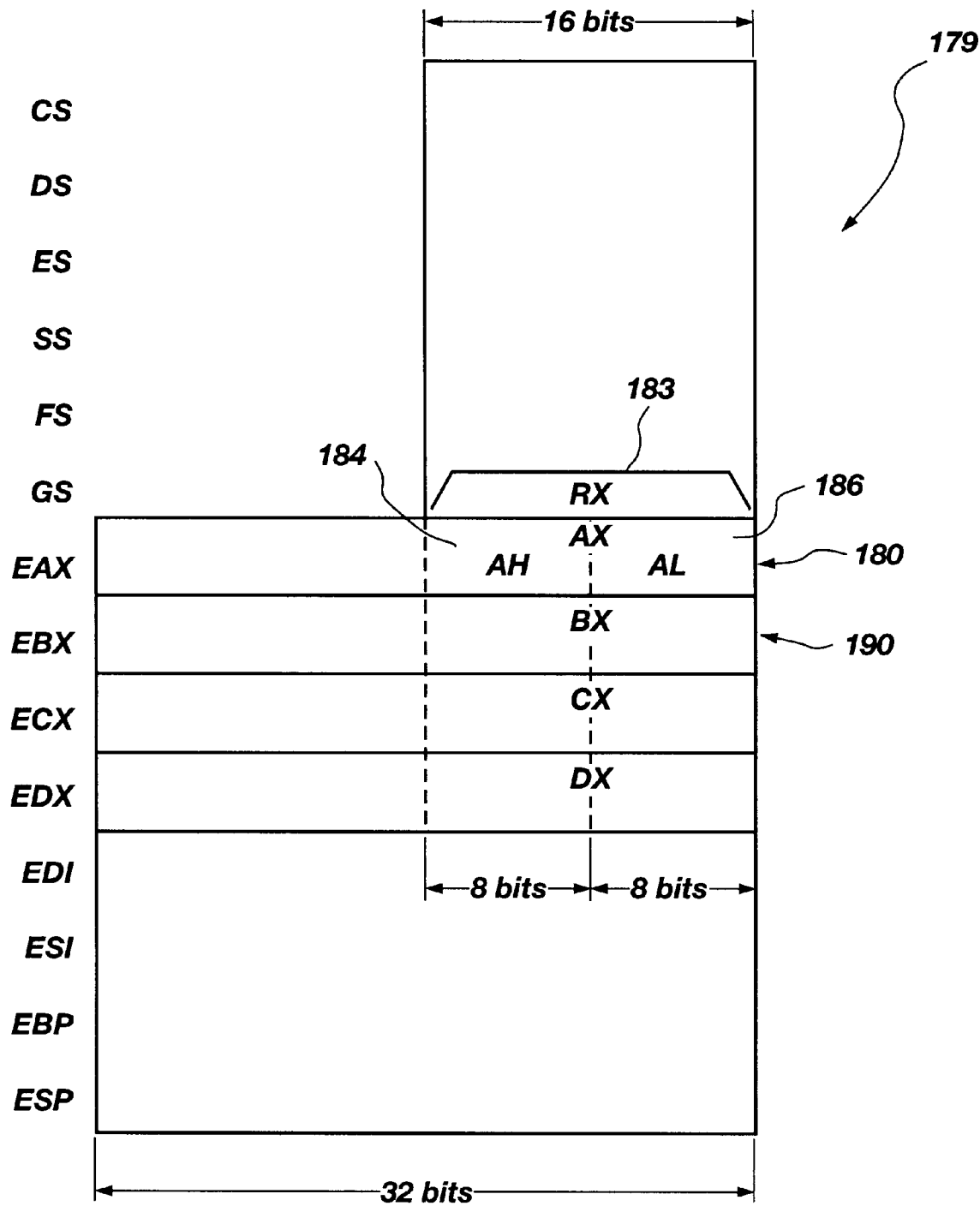
FIG. 5 is a schematic block diagram of registers used for addressing.

Referring to FIG. 5, an efficient fetch/decode/JUMP algorithm may begin with an XOR of the contents of a register EAX 180 against itself. The effect of the XOR is to zero out the contents of the EAX register 180. The contents of register EAX 180 may represent a pointer. Following this clearing operation, a MOVE instruction (MOV) may move the contents of a memory location corresponding to a pointer (next logical instruction number) and identified by the label or logical instruction number stored in a register EBX 190 into the register AL 186.

The register AL 186 is the lower eight bits of the AX register 182. The AX register 182 is the lower 16 bits of a 32 bit EAX register 180. The upper eight bits of the AX register 182 constitute the AH register 184. The AL 186 or lower register 186 thus receives the contents of a memory location corresponding to a current instruction 91 being pointed at by the contents of the EBX 190 register.

Following the MOVE instruction, a SHIFT instruction may shift left by five bits (effectively a multiplication by a value of 32) the contents of the EAX register 180. Since the EAX register 180 was zeroed out, and only the AL register was filled, a shift left of the EAX register 186 multiplies its value by 32. This shift left is effectively a decoding of the instruction that was fetched by the MOVE instruction.

Continuing with the procedure, a JUMP instruction may be implemented to position EAX in the set of virtual machine instructions. Note that each virtual machine instruction 91 in the complete set 90, when loaded, is written within the same number of bytes (32 bytes for the native code segment implementing the virtual machine instruction). The code segment 106 for each instruction 91 begins at a block boundary 116 and at the beginning of a cache line 140. Thus, a virtual machine instruction number multiplied by 32 will step through each of the native code segments 106. Thus, a JUMP to EAX constitutes a direct addressing of the native code segment 106 required to implement a particular virtual machine instruction 91.

Other mechanisms exist to address memory 20. For example, vector tables are commonly used. However, such mechanisms require certain calculations to occur in order to execute a JUMP. Moreover, memory access is required in order to complete the determination of a value in a vector table. Thus, the processor 12 must request access to the main memory 18, 20 in order to fulfill the request for a vector table entry. Accessing main memory and other operations requiring requests to be managed by the bus 32 may increase access times by more than orders of magnitude. The simple arithmetic logic unit operation of a JUMP in the preferred embodiment, is much more efficient than the vector table approach that imposes a memory reference on top of a simple JUMP operation.

Different types of caching implementations may exist in hardware. Three common types of cache architectures are direct-mapped, fully-associative, and a set-associative. Cache technology is described in detail in Computer Architecture: A Quantitative Approach by John L. Hennessy and David A. Patterson published in 1990 by Morgan Kaufman Publishers, Inc. of San Mateo, Calif. (See Chapter 8).

In an apparatus and method in accordance with the invention, any type of cache 60 may be used. In one currently preferred embodiment, a two-way set associative cache 60 may be used.

In a direct-mapped cache 60, several blocks or lines 140 exist. A cache line 140 may contain some selected number of bytes, as determined by the hardware. Typical cache lines 140 have a length of 16 or 32 bytes. Likewise, each cache structure will have some number of addressable lines. An eight bit addressing scheme provides 256 cache lines in a cache.

Each byte of memory within a memory device 14, including read/write types as well as read-only types, especially a main random access memory device 20, is directly addressable. One common caching scheme for a direct mapped cache architecture may map a memory device 20 to cache lines 140 by block. The memory's addressable space may be subdivided into blocks, each of the same size as a cache line. For example, an entire random access memory 20 may be subdivided into 32-byte blocks for potential caching.

A significant feature of a direct-mapped cache is that every block of memory within the source memory device 20 has a specific cache line 140 to which it will be cached any time it is cached. In one scheme, the least significant bits in an address corresponding to a block within a memory device may be truncated to the same size as the address of a cache line 140. Thus, every block of memory 20 is assigned to a cache line 140 having the same least significant bit address.

In a fully-associative, caching architecture, no binding need exist between any particular block of memory in the memory device, and any cache line a priori. Allocation of a cache line 140 space to a particular block of memory 20 is made as needed according to some addressing scheme. Typical schemes may include random replacement. That is, a particular cache line 140 may simply be selected at random to receive an incoming block to be cached.

Alternative schemes may include a least-recently-used (LRU) algorithm. In a least-recently-used (LRU) scheme, a count of accesses may be maintained in association with each cache line 140. The cache line 140 that has been least recently accessed by the processor 12 may be selected to have its contents replaced by a incoming block from the memory device 20.

A set-associative architecture subdivides an associative cache into some number of associative caches. For example, all the lines 140 of a cache 60 may typically be divided into groups of two, four, eight, or sixteen, called "ways." Referring to the number of these ways or subcaches within the overall cache 60, as n, this subdivision has created an n-way set-associative cache 60.

Mapping of block-frame addresses from a main memory device 20 to a cache line 140 uses the associative principle. That is, each way includes an $n^{th}$ fraction of all the available cache lines 140 from the overall cache 60. Each block from the main memory device 20 is mapped to one of the ways. However, that block may actually be sent to any of the cache lines 140 within an individual way according to some available scheme. Either the LRU or the random method may be used to place a block into an individual cache line 140 within a way.

For example, a main memory address may be mapped to a way by a MODULO operation on the main memory address by the number of ways. The MODULO result then provides the number of a "way" to which the memory block may be allocated. An allocation algorithm may then allocate the memory block to a particular cache line 140 within an individual way.

Another cache may be used, with less effective results. Loading and pinning may also be done using test instructions, although more time-consuming. Instead of test instructions, the proposed method flushes the cache, running a simple application 130 containing every VMI 91 of a desired set 90 to be loaded. Before disabling the processor cache 60, the method may use the cache's internal programming, built into the fundamental hardware architecture, to provide a high-speed load. Disabling permits access to the processor cache 60, but not replacement, completing an effective pinning operation.

In one currently preferred embodiment, the closest cache to the processor is used as the processor cache 60. For example, in the Pentium™ processor, the level-1 code cache 60 may be used. In other embodiments, an external cache 64, or a level-1 integrated (not segregated between code and data) cache 58 may be used. Thus, whenever a processor cache 60 is specified, any cache 58, 60, 64 may be used, and the closest is preferred.

Pinning is particularly advantageous once an environment, or rather the executable instructions constituting an environment, have been programmed in a form that fits the entire instruction set into an individual processor cache 60, with one instruction corresponding to one cache line 140. Benefits derived from this method of architecting and pinning the virtual machine are several.

For example, no cache line 140, during execution of a virtual machine 90, need ever be reloaded from main memory 18, 20. In addition to the time delay associated with having to access the bus 32, access times within memory devices 14 themselves vary. Typically, a cache access time is an order of magnitude less than the access time for a main memory location. Reloading a cache line 140 is likewise a time-consuming operation.

Here, every branch destination (the object of a JUMP) within the virtual machine 90 may be located at a fixed cache line position. Thus, no penalty is created for address generation within the cache 60 itself. Rather, each cache line 140 may be addressed directly as the address of the instruction 91 being requested.

That is, typically, a cache controller must manage an addressing algorithm that first searches for a requested reference within the cache. If the reference is not present, then the cache controller requests over the bus 32 from main memory the reference. The address generation, management, and accessing functions of the cache controller are dramatically simplified since every desired address is known to be in the cache for all code references.

Many modern processors such as the Pentium™ series by INTEL™ contain hardware supporting branch prediction. That is, when a branch operation is to be executed, the processor predicts the destination (destination of a JUMP) to which the branch will transfer control. With a pinned cache containing the entire instruction set 90 of the virtual machine 90, all branch destinations are known. Every instruction has a cache line 140 associated therewith which will never vary. Not only does this correspondence not vary within a single execution of the virtual machine, but may actually be permanent for all loadings of the virtual machine.

Likewise, a branch prediction table is typically updated along with cache line replacement operations. Since the cache lines 140 need never be replaced while the virtual machine is loaded into the cache, and pinned, the branch prediction table becomes static. Inasmuch as the prediction table becomes static, its entries do not change. Moreover, every referenced code instruction is guaranteed to be in the cache. Therefore, any benefits available to a branch prediction algorithm are virtually guaranteed for an apparatus and method operating in accordance with the invention. Flushes of the pipelined instructions now approach a theoretical minimum.

In the Pentium™ processor by INTEL™, two arithmetic logic units (ALUs) correspond to a 'U' pipeline and a 'V' pipeline. Each arithmetic logic unit (ALU) may execute an instruction with each clock count. However, if two instructions must occur in sequence, then one pipeline may be idled. Thus, the 'V' pipeline may be idled during any clock count that requires two instructions to be executed in sequence rather than in parallel.

Typical optimal programming on Pentium™ processors may achieve 17 to 20 percent pairing between instructions. By pairing is meant that instructions are being executed in both the 'U' and 'V' pipelines. Here that occurs about 17 to 20 percent of the time in a Pentium™ processor.

Due to the careful architecture of the instruction set, as well as pinning the instruction set, a method and apparatus in accordance with the invention may routinely obtain 60 percent utilization of the 'V' (secondary) pipeline. The selection and ordering of the virtual machine instructions have been implemented to optimize pairing of instructions through the pipelines.

Figure 6:
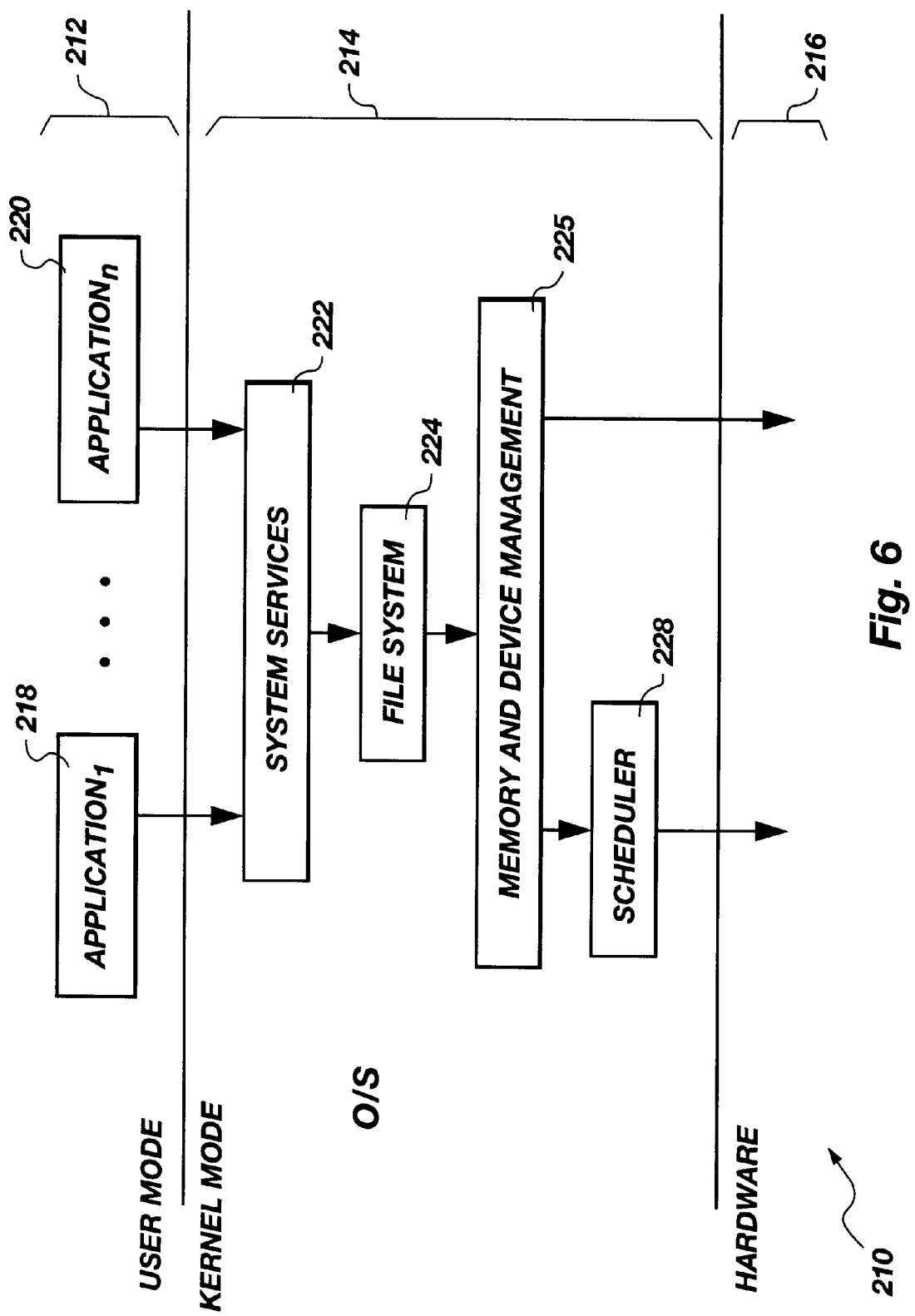
FIG. 6 is a schematic block diagram of an operating system that may be executed by the processor of FIG. 1.

Referring to FIGS. 6–9, as well as FIGS. 1–3, when multi-tasking, competing processes may try to use the processor 12 and the processor cache 60. A virtual machine application 120 may run in an interpretive environment 90 (the virtual machine 90) that is one among several native-code applications 218, 220 (FIG. 6).

In general, a small fraction of available processing time may be required for execution of native code 128 implementing a virtual machine application 120. This time is fragmented across the entire time line of a processor 12, shared by all multi-tasked processes.

A method 160 and apparatus 10 to pin a processor cache 60 for a user of a virtual machine 90 hosted on a computer 11 (individual) are taught previously herein. Pinning into individual cache lines 140 the code segments 106 implementing the individual instructions 91 of the virtual machine 90 dramatically improves the processing speed for virtual machine applications 120 (applications operating in the virtual machine environment 90).

However, if a virtual machine 90 is pinned, consuming the entire processor cache 58 of a multi-tasking operating system 214, it eliminates the availability of the processor cache 64 to service other native-code applications 218, 220. In a multi-tasking environment, this may degrade performance significantly. A virtual machine application 120, by its very presence, may degrade the operation of the entire panoply of applications 218, 220 (including itself) being executed by the processor 12.

Meanwhile, pinning and unpinning by any conventional method would add processing overhead, burdening the carefully constructed cache contents to render less favorable performance.

Here, the need is to load, pin, run, and then unpin rapidly and frequently for interpretive applications 120 in order to provide a faster execution of all applications 218, 220 running. Otherwise, the pinned processor cache 60 will degrade performance of all native-code applications 218, 220. For example, in one test, multi-tasked, native-code applications 218, 220 ran 3 to 5 times slower with a pinned processor code cache 60.

The invention contemplates very fast loading and pinning. A mock application 120 may serve to load all the VMI code segments 100 into the respective cache lines 140.

Figure 7:
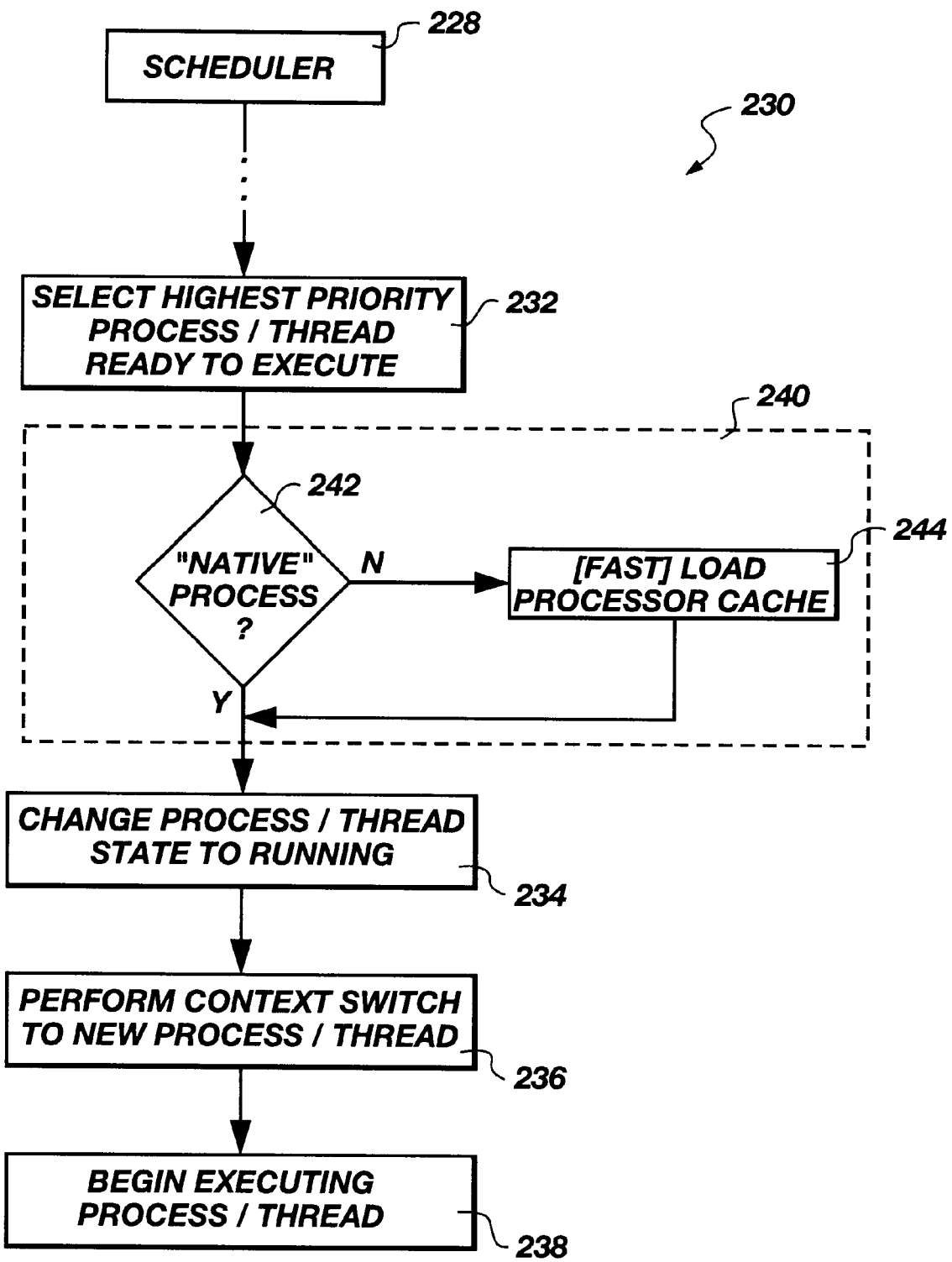
FIG. 7 is a schematic block diagram of processes occuring in a scheduler of FIG. 6, illustrating hooking a pin manager therein.

Referring to FIG. 7, a hooked pin manager 240, in a scheduler 228, executing a scheduling process 230 in an operating system 214 may control persistence of the contents of a processor cache 60. Persistence may encompass the enabling of the processor cache and the interrupts.

By hooking, is meant the process of altering the control flow of a base code, in order to include an added function not originally included in the base code. Hooks are often architected into base codes with the intention of permitting users to add customized segments of code at the hooks. Customized code might be added directly at the hook, or by a call or jump positioned as the hook within a base code.

Here, a hook into the scheduler 228 need not be an architected hook. For example, the scheduler 228 may have a jump instruction added surgically into it, with a new "hooked" code segment placed at the destination of the jump, followed by the displaced code from where the jump was written in, and a return.

Alternatively the scheduler 228 may be modified at some appropriate jump instruction, having an original destination, to jump to the destination at which is located a "hooked" code segment, such as a pin manager. Thereafter, the pin manager may, upon completion of its own execution, provide a jump instruction directing the processor 12 to the original destination of the "hooked" jump instruction.

Referring now to FIG. 6, certain processes 212, 214, 216 or modes 212, 214, 216 are illustrated for an apparatus 10 with an associated processor 12. In general, applications 218, 220, in some number may be executing in a multi-tasking environment hosted by a processor 12. The applications 218, 220 operate at a user level 212 or a user mode 212. Accordingly, the applications 218, 220 are "visible" to a user.

Below a user level 212 is an operating system level 214. The operating system level 214 may also be referred to as kernel mode 214.

The operating system (O/S) 214 is executed by the processor 12 to control resources associated with the computer 11. Resources may be thought of as hardware 10 as well as processes available to a computer 11. For example, access to memory 18, 20, storage 16, I/O devices 22, 24, peripheral devices 28, and operating system services 222 are all controlled resources available in a computer system. Functional features such as serving files, locking files or memory locations, locking processes into or out of execution, transfer of data, process synchronization through primitives, executing applications and other executables, may all be controlled as process resources by the operating system 214.

Applications 218, 220 at a user level 212 may communicate with a systems services module 222 or systems services 222 in an operating system 214. The system services 222 may provide for communication of a request from applications 218, 220 and for eventual execution by the processor 12 of those tasks necessary to satisfy such requests.

A file system 224 may provide for addressing and accessing of files. System services 222 may communicate with the file system 224 as necessary. Meanwhile, the file system 224 may communicate with a memory and device management module 226. Each of the modules 222, 224, 226, 228 may be thought of as one or more executables within an operating system 214 for accomplishing the mission or responsibilities assigned according to some architecture of the operating system 214. Whether or not a module exists as a single continuous group of executable lines of code is not relevant to the invention. Any suitable mechanism may be used to provide the functionality of the system services 222, while system 224, memory and device management 226, and the scheduler 228.

The memory and device management module 226 may control a memory management unit associated with a memory device 14 or the main memory 20. Likewise, the device management function of the memory and device management module 226 may control access and operation of the processor 12 with respect to input devices 22, output devices 24, and other devices that may be connected peripherally through the port 28.

The scheduler 228 provides for scheduling of the execution of the processor 12. Accordingly, the scheduler 228 determines what processes or threads will be executed by the processor 12. The hardware level 216 may include any or all of the components of the computer 11 controlled by the operating system 214.

Figure 8:
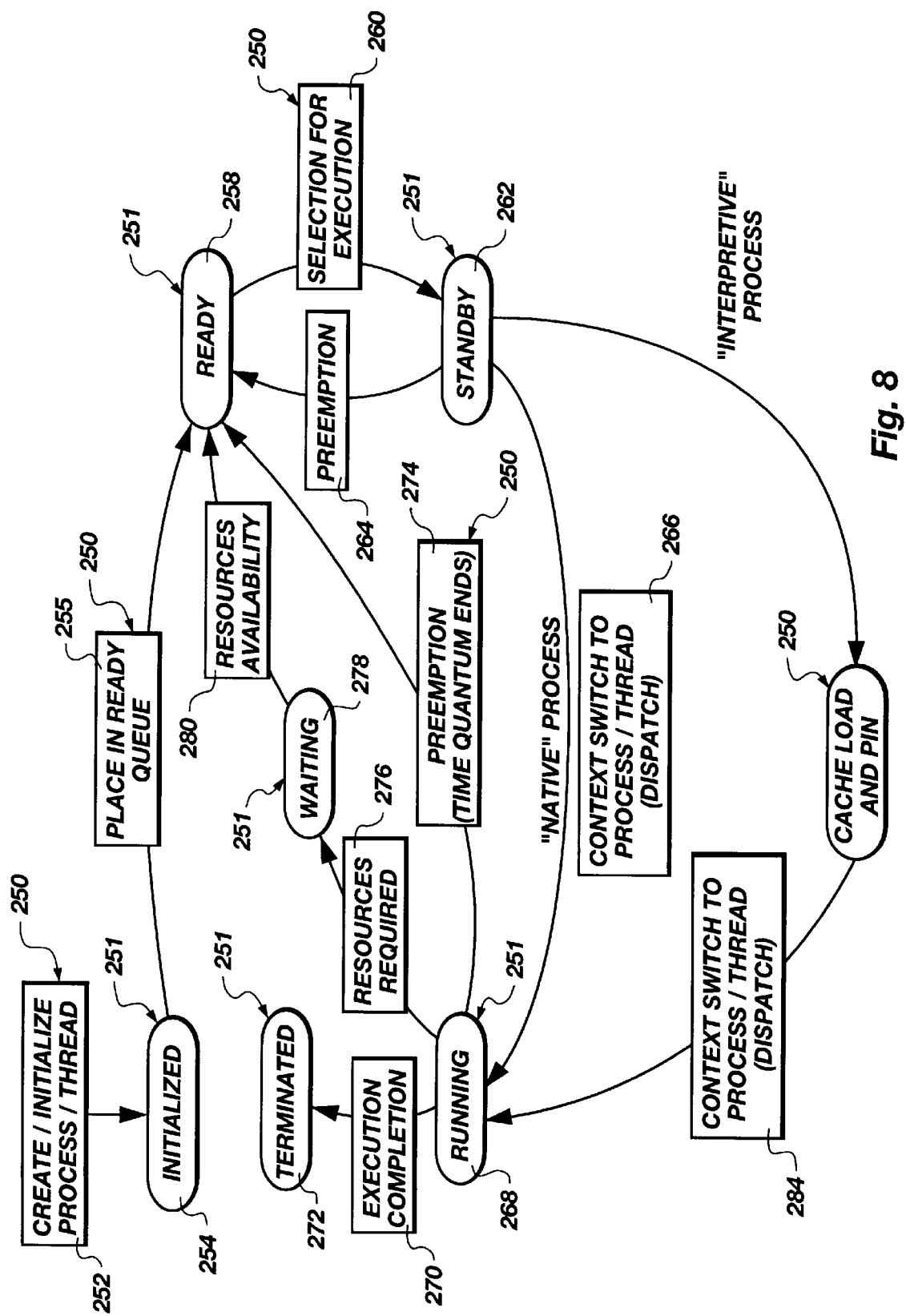
FIG. 8 is a schematic block diagram of an alternative representation of processes of FIG. 7 illustrating states of a process or thread executed by the processor in accordance with the scheduler.
Figure 9:
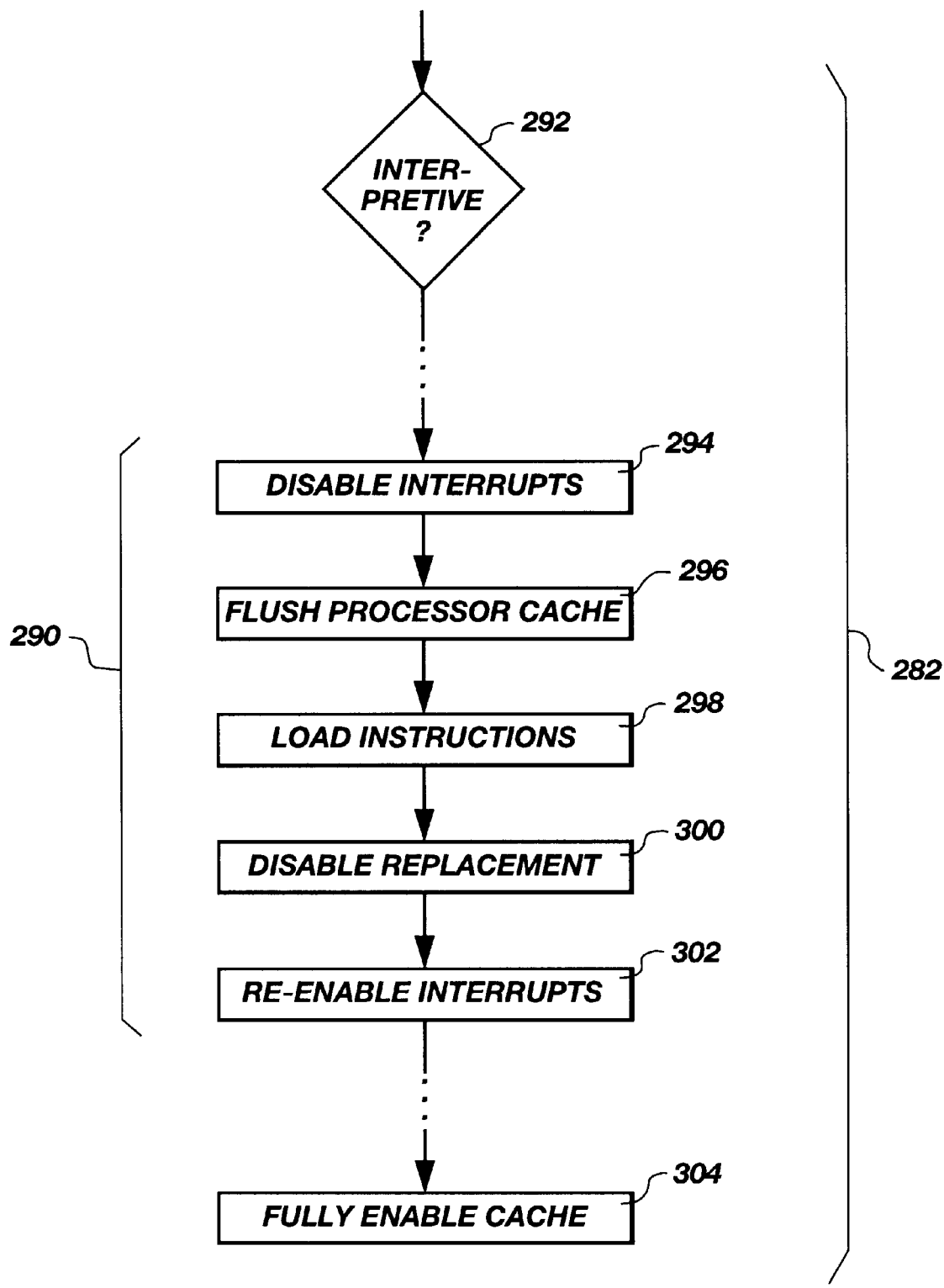
FIG. 9 is a schematic block diagram of steps associated with a pin manager, generalizing the fast loading process of FIG. 4, and adapting it to a multi-tasking environment.

Referring now to FIGS. 7–9, the scheduler 228 may provide for execution of certain processes 160 (see FIG. 4), 230 (see FIG. 7), 250 (see FIG. 8), 290 (see FIG. 9). For example, the processes 250 represented in rectangular boxes may be executed by the processor 12 in advancing a particular thread, process, program, or application between various states 251.

Referring now to FIG. 7, the scheduler 228 may give control of the processor 12 to the process 230. The process 230 may select 232 a process or thread having a highest priority among such processes or threads, and being in a ready state 258.

A change 234 may follow the select 232 in order to convert the selected process or thread to a running state 268. A context switch 236 may be performed to support the selected process or thread. A context switch may involve a setup of particular components in the hardware level 216 required to support a selected process or thread.

Following the context switch 236, the selected process or thread may execute 238. In a multi-tasking environment, the process or thread may not execute to completion with one continuous block of time in control of the processor 12. Nevertheless, a selected process or thread may execute 238 until some change in the associated state 251 occurs, or until some allocated time expires.

The process 230 may have an interposed process 240 hooked into it. In one embodiment, the interposed process 240 may include a test 242. The test 242 may determine whether or not a selected process or thread is a native process or not. A native process may operate in native code. A non-native process may operate in some other environment such as an interpretive environment. The test 242 may therefore determine whether a virtual machine 90 needs to be loaded into the processor cache 60.

A load process 244 may execute with a selected process or thread. The load process 244 may be implemented in any suitable manner. In one currently preferred embodiment of an apparatus and method in accordance with the invention, the load 244 may use a fast load process 160. However, in general, test instructions or any other mechanism may be used to perform a generic load process 290. A fast load process 160 requires substantially fewer instructions and less time in execution by the processor 12. As explained above, the fast load process 160 takes advantage of the architecture of the hardware level 216 to load a processor cache 60 in the minimum amount of time.

Referring to FIG. 8, an alternate view of the processes 250 and the associated states 251 associated therewith are illustrated. An initialize process 252 may create or initialize a selected process or thread. The selected process or thread will then be in an initialized state 254.

The processor 12, when time and resources become available, may queue 256 a process or thread into a ready state 258. From the ready state 258, a selection 250 may occur for a process or thread having a highest priority. The selection 250 may be thought of as corresponding to a select 232.

A selection 250 may advance a process or thread selected to a standby state 262. Nevertheless, priorities may shift. Thus, a preemption 264 may move a selected process or thread from a standby state 262 to a ready state 258.

In normal operation, a context switch 266 may occur to dispatch a process or thread from a standby state 262 to a running state 268. A running state 268 indicates that a selected thread or process has control of the processor 12 and is executing. One may think of the standby state 262 as existing between the selection 250 process and the context switch 266 process. From a different perspective, the select step 232 and the change step 234 of FIG. 7 may correspond to the selection 250 and context switch 266, respectively. In normal operation, an executing process or thread may move from a running state 268 to a terminated state 272 if completion 270 occurs. Execution completion 270 frequently occurs for any given process or thread since an available quantum of time allocated for a running state 268 in often sufficient for completion 270. Nevertheless, another frequent occurrence is a requirement 276 for resources. For example, the process or thread may need some input device 22 or output device 24 to perform an operation prior to continued processing. Accordingly, a requirement 276 may change a process or thread to a waiting state 278.

The availability 280 of resources may thereafter advance a process or thread from a waiting 278 to a ready state 258. Alternatively, expiration of the quantum of time allocated to the running state 268 of a thread or process may cause a preemption 274. The preemption 274 step or procedure may return the thread or process to the ready state 258 to be cycled again by a selection 250.

In one currently preferred embodiment of an apparatus and method in accordance with the invention, a cache load and pin process 282 (cache load 282, load 282) may precede a context switch 284, corresponding to the context switch 266 for a native process. The load 282 occurs only for interpretive processes as detected by the test 242 executed between the select step 232 (e.g. selection 250) and the change step 234 (e.g. context switch 284). A context switch 266, 284 may be thought of as operating on affected registers, such as by saving or loading context data, changing the map registers of the memory management unit, and the like, followed by changing the state of the processor 12 between one of the states 251.

The load 282 may be completed by any suitable method. For example, notwithstanding their less desirable approach, test instructions may be used to fashion a load process 282. Nevertheless, the process 160 (see FIG. 4) may properly be referred to as a fast load process 160 or a fast load 160 of a processor cache 60.

The effect of adding a load step 282 (driver 282, pin manager 282) before a context switch 284 is to set up an environment (e.g. virtual machine 90) in which to execute an interpretive application 218 (see FIG. 6) such as a virtual machine application 120 (see FIG. 3). One may note that a selection 250 of a native process or thread results in the immediate context switch 266 as the subject process or thread transitions from a standby state 262 to a running state 268. Accordingly, the processor cache 60 operates normally for any native process following the context switch 266. By contrast, a dynamic load and pin process 282, such as the fast load 160, may be executed very rapidly prior to a context switch 284 prior to placing an interpretive process or thread into a running state 268.

Referring to FIG. 9, an alternative embodiment of a load and pin process 282 (e.g. interposed process 240) is illustrated. A test 292 may determine whether or not a process resulting from a selection 260 is an interpretive process. The test 292 may be hooked in any suitable location among the processes 250. A flag may be set to determine whether or not to activate or hook a load and pin process 282 in any procedure occurring between a standby state 262 and a running state 268. However, in one currently preferred embodiment, the interposer routine 240 (see FIG. 7) may be hooked into the select 232 (e.g. selection process 260) or the context switch process 266. In one currently preferred embodiment, the entire interposer routine 240 may be hooked as the cache load and pin process 282 in the context switch 284, but before any substantive steps occur therein. The context switch 284 may be different from the context switch 286 for a native process or thread.

Thus, in one currently preferred embodiment, the load 282 (processor cache 60 load and pin process 282) may be as illustrated in FIG. 9. Meanwhile, a portion 290 of the load 282 may be replaced by the fast load 160. Note that the disable 294 may correspond to a disable 162 and the re-enable 302 may correspond to the enable 170 of interrupts. Similarly, the flush 296 may correspond to the flush 164 described above. The load instructions step 298 may or may not correspond to the execute 166 of the fast load 160. Any suitable method may be used for the load 298. The example mentioned before, using test instructions, is completely tractable. The fast load 160 using execution of a mock application 120 architected to use every instruction of a 91 of a virtual machine 90 in order to load each of the native code segments 106 corresponding thereto is simply the fastest currently contemplated method for a load 298.

Likewise, the disable 300 corresponds to a disable 168. However, the disable 300 specifically disables only the ability of a cache controller to change the contents of a cache line 140 in the processor cache 60 is affected. In all other respects, the processor cache 60 may operate normally following the re-enable 302 of interrupts. Thus, the enable 304 of the processor cache 60 may not be required as a separate step in certain embodiments. For example, the re-enable 302 with only a limited disable 300 may fully enable 304 a processor cache 60. However, in certain embodiments, such as when using test instructions, an extra enable step 304 may be required to return all the functionality to a processor cache 60. Again, note that by processor cache 60 is meant any of the caches 58, 60, 64 for use by the processor, although a segregated, code cache 60, closest to the processor is one preferred embodiment.

Referring to FIGS. 7–9, the pin manager 240, 282 may be added at an operating systems (O/S) level 214 as a driver 226 (see FIG. 6) or contained in a driver 282 recognized and allowed by the O/S to be loaded by the O/S. This driver is at a systems level 214 of privilege. A reason why the pin manager is a driver is that this is a way to obtain systems level privileges. The O/S loads the driver 240, 282, and allows the driver 240, 282 to initialize 252, transferring control to an initialization routine 252.

As part of the initialization routine 252, the driver 240, 282 either hooks, or creates hooks to later hook into, the operating system 214. It is important to note that the driver 240, 282 is in control of the processor 12, once loaded, and the O/S 214 has turned over control to the driver and its initialization routine 252, until that control is returned. Drivers 226 have a standard set of commands that may be executed. Drivers 226 also recognize certain commands receivable from the O/S 214.

The pin manager 282 could not communicate with the processor cache 60 absent this systems privilege level, nor could it attach (hook) itself into the O/S 214. Thus, the pin manager 240, 282, by being a driver 226, fitting the device driver formats and protocols, may be recognized by the O/S 214. This recognition is not available to an application 218, 220. With this recognition, the pin manager 240, 282 (driver 240, 282) is designated as privileged-level code and can therefore contain privileged-level instructions of the processor 12.

Certain instructions may exist at multiple privilege levels. However, each such instruction is treated differently, according to the associated privilege level. For example, a MOVE instruction may mean the same in any context, but may only be able to access certain memory locations having corresponding, associated, privilege levels.

The interrupt disable 162, 294 (CLI instruction), flush 164, 296 (FLUSH or WBFLUSH), disable cache 168, 300, and enable cache 304 are privileged level instructions. They are available in the operating system environment 214 (privileged or kernel mode 214) to systems programmers writing operating systems 214, device drivers 226, and the like. So long as a user is authorized at the appropriate privilege level 214, the instructions are directly executable. If a user is not at the required level 214 of privilege, then the processor 12 generates an "exception" to vector off to an operating system handler to determine what to do with an errant program using such instructions improperly.

Typically, to disable 168, 300 or to turn a cache on or off requires a user, such as a system programmer, to execute a setup routine directly controlling the Basic Input/Output System (BIOS). This operation is not usually undertaken. Disabling 168, 300 a processor cache 60 is not routinely done, and to do so selectively is counter-intuitive.

Moreover, to repeatedly disable 168, 300 and re-enable 304 the processor cache 60 is folly by conventional wisdom. Likewise, to dynamically enable 304, load 298, and disable 162, 300 the processor cache 60 is highly counter-intuitive. However, in accordance with the invention, conventional wisdom is superceded to good effect.

The expressions "dynamic pinning" 282 and "programmatic management" of a processor cache 60 reflect the exercise, at run time, of control of both cache contents and their duration in accordance with the individual needs determined for a specific program 218, 220.

A major benefit of dynamic pinning 298 of a processor cache 60 is an ability to manage the loading 298 and pinning 300 of a virtual machine 90 (VM, interpretive environment 90) in a processor cache 60 (e.g. level-1 code cache 60) in order to optimize the entire workload of a processor 12. This also maximizes the speed of the virtual machine 90 when run.

A processor cache 60 (or 58, 64) may be any cache adapted to store instructions executable by a processor. The cache may be segregated or not segregated, to have a portion for instructions and a portion for data. Perhaps the most significant feature of a processor cache 58, 60, 64 is the lack of direct programmatic addressing as part of the main memory address space. The processor cache 58, 60, 64 is thus "hidden" from a programmer.

Typically, pre-programmed instructions associated with the architecture of a processor cache 58, 60, 64 determine what is loaded into each cache line 140, when, and for how long. This is typically based on an LRU or pseudo-LRU replacement algorithm. The instant invention relies on direct programmatic controls, and knowledge of the cache architecture to prompt the processor cache 60 to store a certain desired set of contents for use by a specified program. Thus, careful programmatic controls may obtain certain reflexive responses from the processor cache 60 and its internal cache controller, which responses are manipulated by a choice of programmatic actions.

Algorithmic management of a hardware cache on a processor 12, has never allowed "dynamic programmatic control" of a hidden cache. Here, the use of knowledge of the architected response of the cache hardware system 60 programmatically optimizes the processor cache 60 behavior, as the processor cache 60 responds to privileged programmatic commands at an operating system level 214.

Visible caches (memory/RAM caches) exist, such as those for use by databases. However, prior art systems do not pin "invisible" processor caches at a hardware level.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by united states letters patent is:

1. A method for managing dynamic pinning of a processor cache associated with a computer having operably connected a processor, the processor cache, and a memory device, the method comprising:

providing an operating system containing a scheduler;

providing a pin manager executable by the processor;

executing the operating system by the processor;

hooking the pin manager into the scheduler;

executing the pin manager to selectively control the persistence of contents of the processor cache;

providing, after providing the operating system, an application to be executed by the processor in conjunction with the operating system;

determining, as part of executing the pin manager, whether the application is interpretive;

loading, as part of executing the pin manager, an instruction set, associated with an interpretive environment adapted to host the application, into the processor cache as new contents thereof;

disabling, as part of executing the pin manager, the processor cache to prevent changing the new contents, while leaving the cache otherwise functional to provide the new contents to the processor for execution;

disabling, before the loading step, interrupts to the processor to halt undesirable access to the processor cache; and enabling, after the disabling of the processor cache, interrupts to the processor to restore normal operation of the processor.

2. The method of claim 1, wherein loading further comprises running a mock application containing each instruction of the instruction set.

3. The method of claim 1, further comprising flushing the contents of the processor cache, before the loading step.

4. A method for managing dynamic pinning of a processor cache associated with a computer having operably connected a processor, the processor cache, and a memory device, the method comprising:

providing an operating system containing a scheduler;

providing a pin manager executable by the processor;

executing the operating system by the processor;

hooking the pin manager into the scheduler;

executing the pin manager to selectively control the persistence of contents of the processor cache;

providing applications to be executed by the processor in conjunction with the operating system;

determining, in conjunction with the pin manager, whether a next application of the applications to be executed is interpretive;

disabling interrupts to the processor to halt undesirable access to the processor cache;

loading an instruction set, corresponding to the interpretive environment, into the processor cache as new contents thereof;

disabling the processor cache to prevent changing the new contents while leaving the processor cache otherwise functional to provide the new contents to the processor for execution; and enabling interrupts to the processor to restore normal operation of the processor.

5. The method of claim 4 further comprising flushing the processor cache to remove contents thereof before the loading step.

6. The method of claim 4, wherein loading further comprises running a mock application containing each instruction of the instruction set.

* * * * *